US006009443A

United States Patent [19]

Kawamura

[11] Patent Number: 6,009,443

[45] Date of Patent: Dec. 28, 1999

[54] ELECTRONIC DICTIONARY AND LANGUAGE INTERPRETER WITH MULTIPLE INFLECTION DISPLAY

[75] Inventor: Shuji Kawamura, Chiba, Japan

[73] Assignee: Seiko Instruments Inc., Japan

[21] Appl. No.: 08/671,533

[22] Filed: Jun. 27, 1996

[51] Int. Cl.[6] ........ G06T 1/00

[52] U.S. Cl. ........ 707/532

[58] Field of Search ........ 707/532–536; 704/6

[56] References Cited

U.S. PATENT DOCUMENTS 4,420,817 12/1983 Yoshida ........ 704/6
5,229,936 7/1993 Decker et al. ........ 704/10

*Primary Examiner*—Almis R. Jankus

*Attorney, Agent, or Firm*—Adams & Wilks

[57] ABSTRACT

An electronic dictionary searching all conjugations of combinations of the person and the tense easily and quickly, displaying them, and switching the display of the inflection and the original. The electronic dictionary has original buffer memory 13 for storing original data and inflection buffer memory 14 for storing inflection data searched by data reference means 5. The person and the tense of inflection are set up by person set up counter 10 and tense set up counter 11. The electronic dictionary has switching means for switching to display either the original buffer memory 13 or the inflection buffer memory 14, and for selecting data of the inflection buffer memory 14 and inflection message memory 29. Moreover, person detecting means 31 and tense detecting means 32 are connected to the input buffer memory 8 to detect grammatical mistakes of the language input in phrase form and to correct them.

35 Claims, 13 Drawing Sheets

FIG. 4 (A)

| Pn | PRONOUN | | PERSON | PERSON |
|---|---|---|---|---|
| P1 | I | yo | 1st Single Masc / Fem | 1st Singular Number |
| P2 | you | tu | 2nd Single Familiar Masc&Fem | 2nd Singular Number Familiar |
| P3 | you | usted | 2nd Single Formal Masc & Fem | 2nd Singular Number Formal |
| P4 | he | el | 3rd Single Masc | 3rd Singular Number Male |
| P5 | she | ella | 3rd Single Fem | 3rd Singular Number Female |
| P6 | it | el / ella | 3rd Single Masc & Fem | 3rd Singular Number |
| P7 | we | nosotros | 1st Plural Masc / Fem | 1st Plural Number |
| P8 | you | vosotros | 2nd Plural Familiar Masc & Fem | 2nd Plural Number Familiar |
| P9 | you | ustedes | 2nd Plural Formal Masc & Fem | 2nd Plural Number Formal |
| P10 | they | ellos | 3rd Plural Masc | 3rd Plural Number Male |
| P11 | they | ellas | 3rd Plural Fem | 3rd Plural Number Female |

FIG. 4 (B)

| Tn | TENSE | TENSE |
|---|---|---|
| T1 | Present Indicative | Present Indicative |
| T2 | Preterit | Preterit |
| T3 | Imperfect Indicative | Inperfect Indicative |
| T4 | Future | Future |
| T5 | Conditional | Conditional |
| T6 | Present Subjunctive | Present Subjunctive |
| T7 | Past Subjunctive | Past Subjunctive |
| T8 | Imperative | Imperative |
| T9 | Present Perfect Indicative | Present Perfect Indicative |
| T10 | Past Perfect Indicative | Past Perfect Indicative |
| T11 | Past Anterior | Past Anterior |
| T12 | Future Perfect | Future Perfect |
| T13 | Conditional Perfect | Conditional Perfect |
| T14 | Present Perfect Subjunctive | Present Perfect Subjunctive |
| T15 | Past Perfect Subjunctive | Past Perfect Subjunctive |
| T16 | Present Progressive | Present Progressive |
| T17 | Past Progressive | Past Progressive |

| TENCE / PERSON | T1 00H | T2 01H | T3 02H | T4 03H | T5 04H | T6 05H | T7 06H | T8 07H | T9 08H | T10 09H | T11 0AH | T12 0BH | T13 0CH | T14 0DH | T15 0EH | T16 0FH | T17 10H |
|---|---|---|---|---|---|---|---|---|---|---|---|---|---|---|---|---|---|
| P1 0H | | | | | | | | | | | | | | | | | |
| P2 1H | | | | | | | | | | | | | | | | | |
| P3 2H | | | | | | | | | | | | | | | | | |
| P4 3H | | | | | | | | | | | | | | | | | |
| P5 4H | | | | | | | | | | | | | | | | | |
| P6 5H | | | | | | | | | | | | | | | | | |
| P7 6H | | | | | | | | | | | | | | | | | |
| P8 7H | | | | | | | | | | | | | | | | | |
| P9 8H | | | | | | | | | | | | | | | | | |
| P10 9H | | | | | | | | | | | | | | | | | |
| P11 AH | | | | | | | | | | | | | | | | | |

ELECTRONIC DICTIONARY AND LANGUAGE INTERPRETER WITH MULTIPLE INFLECTION DISPLAY

BACKGROUND OF THE INVENTION

The invention relates to an electronic dictionary and language interpreter having the capability to display multiple inflections.

In the past, electronic dictionaries have searched for a head word of a first language and a translation word of a second language equivalent to the head word based on an entry word input by a keyboard, and displayed the head word and the translation word. Moreover, electronic dictionaries which display inflections of a word using their function have already been sold. Particularly in conjugation, electronic dictionaries have already been sold which display a head word and a translation word using a phrase form having a subject.

However, there are a great many inflections in some languages. For example, in Spanish, there are about two hundred conjugation combinations of the person (including the first person, the second person and the third person; the singular and the plural; the masculine gender and the feminine gender); and the tense. Therefore, almost all prior electronic dictionaries have displayed only some of the possible combinations. As the prior electronic dictionaries have not been easy to operate and have not immediately displayed conjugation combinations of the person and the tense according to a user's expectations, they have been very inconvenient to use.

Moreover, the prior art electronic dictionaries have always displayed an explanatory message of the person, such as the first person/the second person/the third person, the singular number/the plural number, and the masculine gender/the feminine gender and the tense, such as the present/the past/the future with conjugations or have displayed nothing about the explanatory message. In the former dictionaries, users who wanted to know only the conjugations have not been able to recognize them because of the display of extra message information. The latter dictionaries lack information for users who wanted to study.

SUMMARY OF THE INVENTION

It is therefore an object of the invention to provide a functional, easy to operate electronic dictionary to search and display all conjugations of combinations of the person and the tense in a simple and quick way. A further object of this invention is to provide a more functional electronic dictionary wherein displays of conjugations and their original are easily switched, wherein messages of the person and the tense are displayed on demand, and wherein grammatical mistakes of an entry word input in phrase form are detected, and the corrected entry word (i.e., head word) and its translation word are displayed.

In order to solve the above problems, an electronic dictionary of this invention comprises at least input means for inputting letter data and all kinds of control information, an input buffer memory for temporarily storing letter data input from the input means, dictionary data memory means for permanently storing dictionary data comprised of head words and translation words, inflection set up means to set up the person and the tense, data reference means referring to the dictionary data memory means for original data and conjugation data, the original data being comprised of head words equivalent to letter data input to the input buffer memory and corresponding translation words, the conjugation data being comprised of the head words based on the condition set up by the inflection set up means and corresponding translation words, display control means for converting the dictionary data referred to by the data reference means into display data, and display means for displaying the display data visually.

Moreover, the electronic dictionary of the present invention comprises a message memory for storing data used for indicating the state of conjugation and switching means for switching the display between the display data and the contents of the message memory.

Moreover, the electronic dictionary of this invention comprises a person detecting means and a tense detecting means connected to the input buffer memory.

BRIEF DESCRIPTION OF THE DRAWINGS

FIGS. 4A and 4*b* are views showing factors of conjugations in an English-Spanish dictionary;

DETAILED DESCRIPTION OF PREFERRED EMBODIMENTS

In the electronic dictionary described above, the data reference means refers to the dictionary data memory to obtain inflection data equivalent to the person and the tense set up by inflection set up means, based on the original data equivalent to the entry word input by the input means. The referred to data is displayed visually on the display means by the display control means.

Since the inflection set up means has person set up means and tense set up means which are provided independently, the tense is kept, only the person is changed to the set up value, and the inflection equivalent to the set up value when input to set up the person is carried out by the inflection set up means at the time of displaying the inflection.

As the electronic dictionary has the original memory and the inflection memory for storage of the original data and the inflection data respectively, and means for switching and transferring these data to the display control means, i.e., switching means for switching the display of the original and the inflection, the switching means selects either the original data stored in the original memory or the inflection data stored in the inflection memory to provide the data display. As the set up value of the person and the tense are kept in each set up means, moreover the inflection data equivalent to the set up condition is stored, and at the same time the original data is stored in the original memory, the original is displayed when input to set up the original display by the switching means of the original-inflection display is carried out and the inflection is displayed when input to set up is carried out again.

As the electronic dictionary has switching means to switch the content of the message showing the person and the tense of the inflection and the inflection data and to display the data, the switching means selects either the inflection data stored in the inflection memory or its message memory and displays it. As the switching means switches the display of these data not only by input through the input means but also by a timer operating automatically for a fixed time, they are able to be displayed according to a user's convenience.

As the electronic dictionary has the person detecting means and the tense detecting means connected to the input buffer memory and generates the inflection after finding the original of the data inputted once, the original data and the inflection data which are grammatically correct are referred and displayed even if there are grammatical mistakes in the letter data input in the phrase form.

Referring below to embodiments of this invention based on the drawings.

Figure 1:
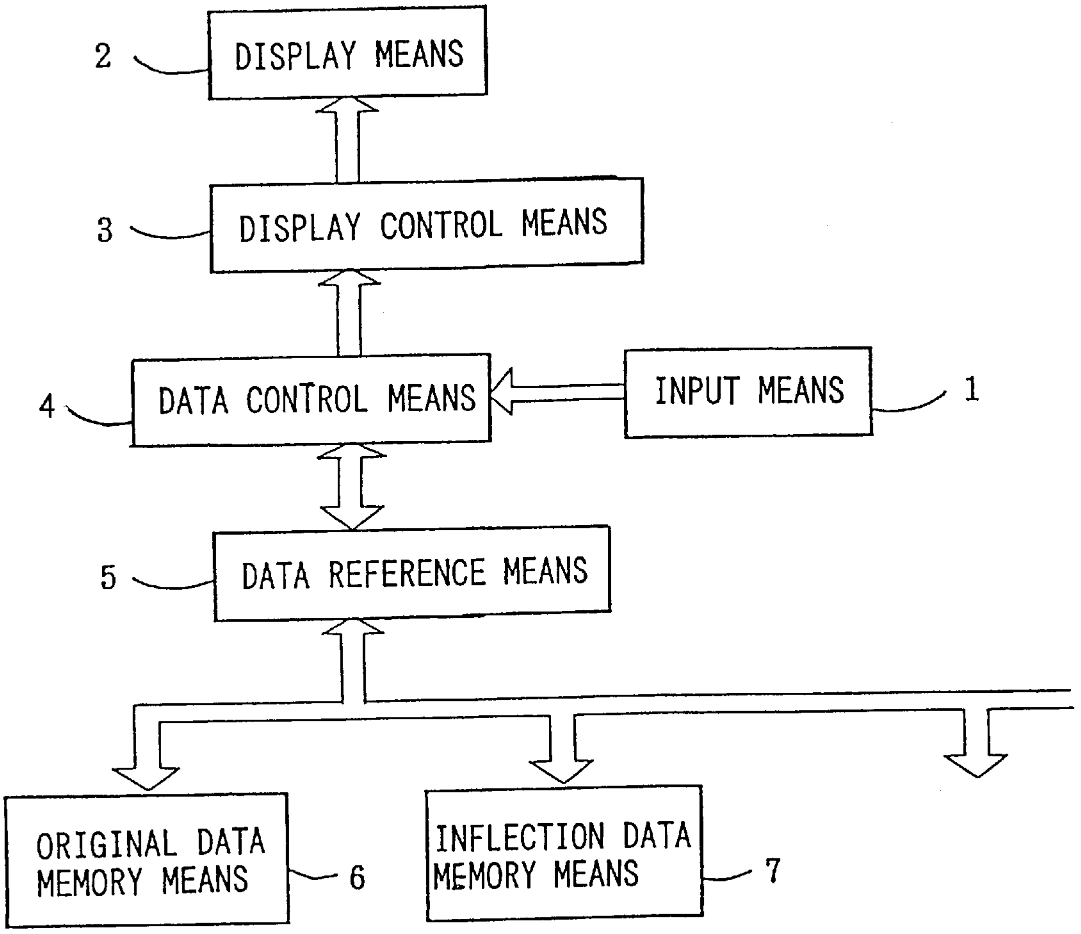
FIG. 1 is a system block diagram of the electronic dictionary according to the present invention.

FIG. 1 is a system block diagram of the electronic dictionary concerning this invention. Input means 1 transmits letter data and control data input to data control means 4. The data control means 4 reads out required data from dictionary data memory means through data reference means 5 based on the demand from the input means, and displays the dictionary data on display means 2 through display control means 3. The dictionary data memory means may include plural memories such as original data memory 6 and inflection data memory 7.

Figure 2:
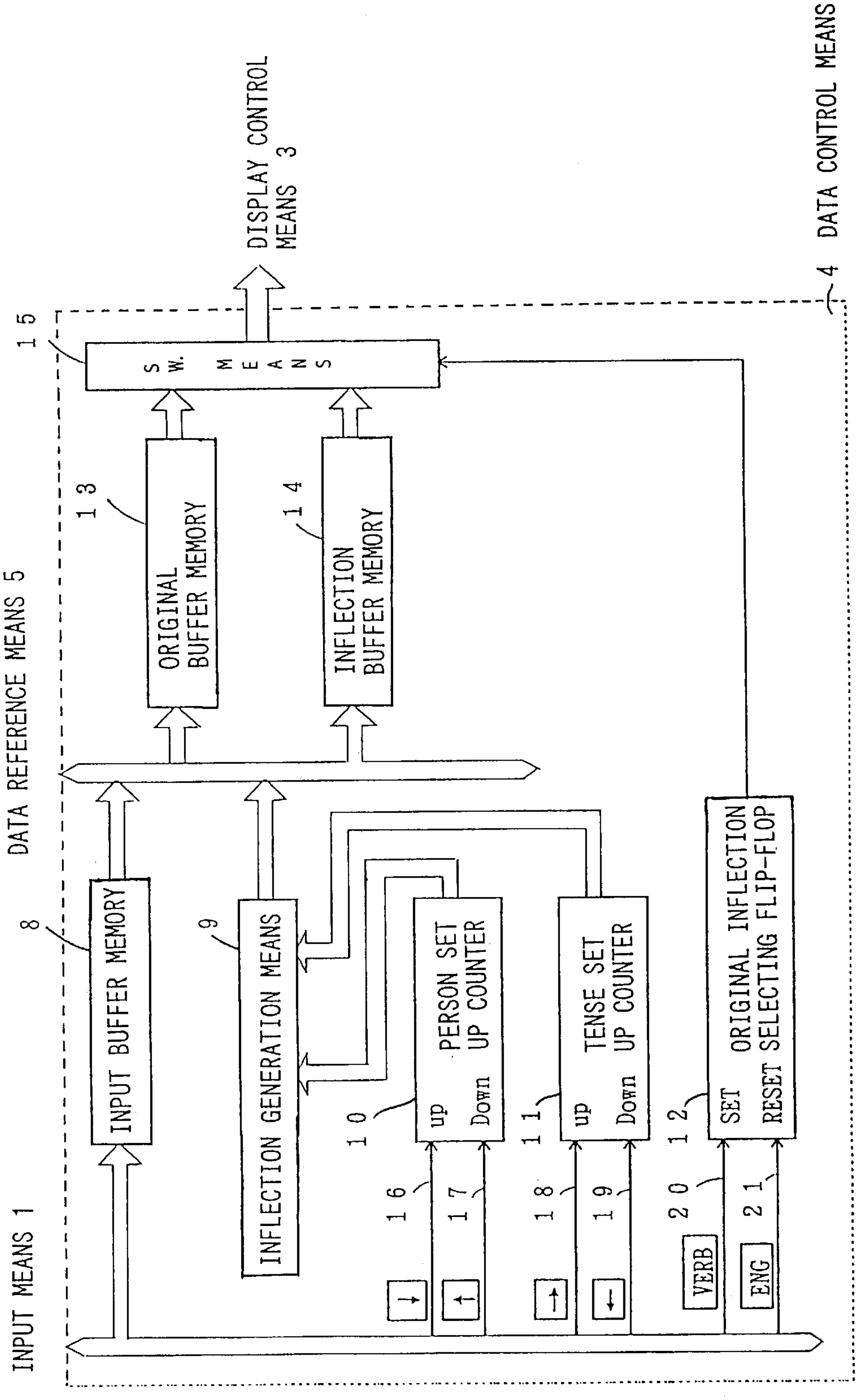
FIG. 2 is a block diagram of a data control means in the electronic dictionary of a first embodiment of this invention.

FIG. 2 is a view showing a first embodiment of this invention in terms of the function of the data control means 4. Input buffer memory 8 stores letter data input from the input means 1. Original buffer memory 13 stores original data which is searched by the data reference means 5 from the dictionary data memory means based on the letter information memorized in the input buffer memory 8. Inflection buffer memory 14 stores inflection data which is searched by the data reference means 5 from the dictionary data memory means based on the command of inflection generation means 9. The person and the tense of inflection set up in the inflection generation means 9 are determined by two up-down counters, namely the person set up counter 10 and the tense set up counter 11. Switching means 15 switches the original buffer memory 13 and the inflection buffer memory 14 to display either of them based on an output of original-inflection selecting flip-flop 12.

Figure 3:
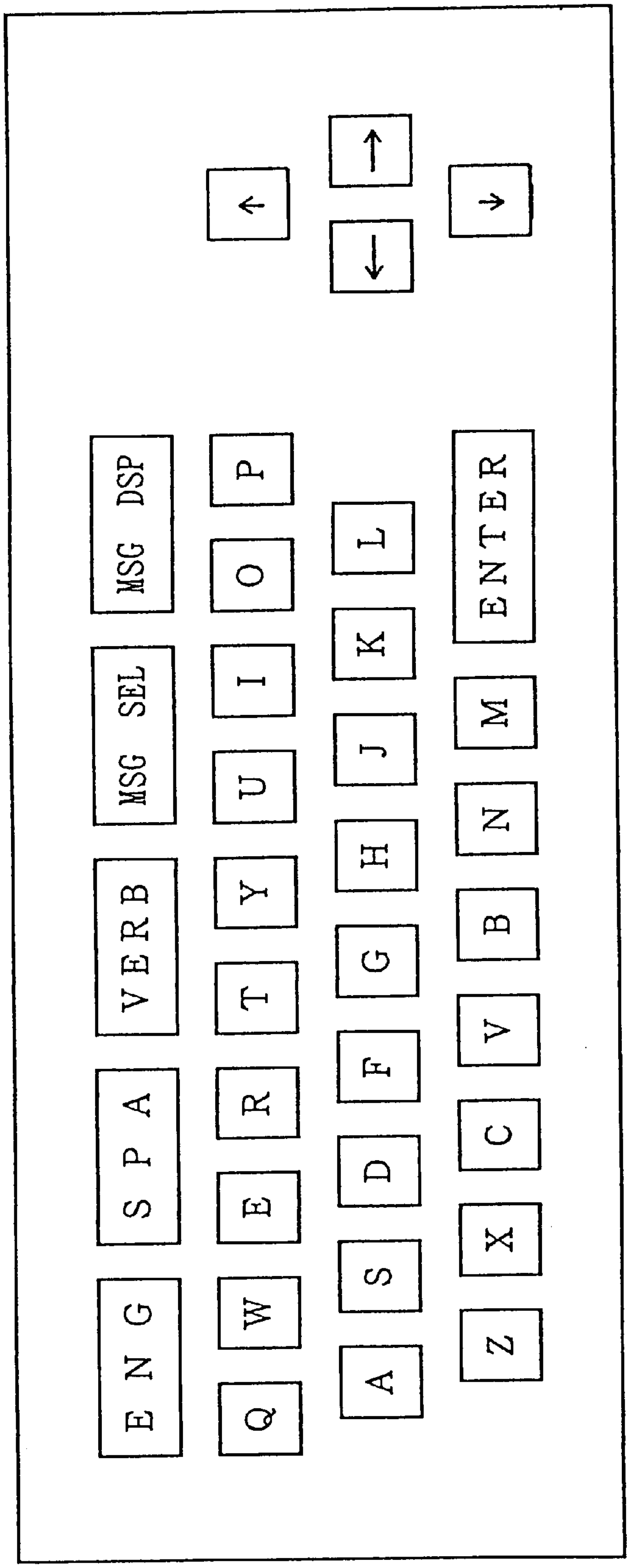
FIG. 3 is a view of a keyboard showing an example of the input means according to the present invention.
Figure 5:
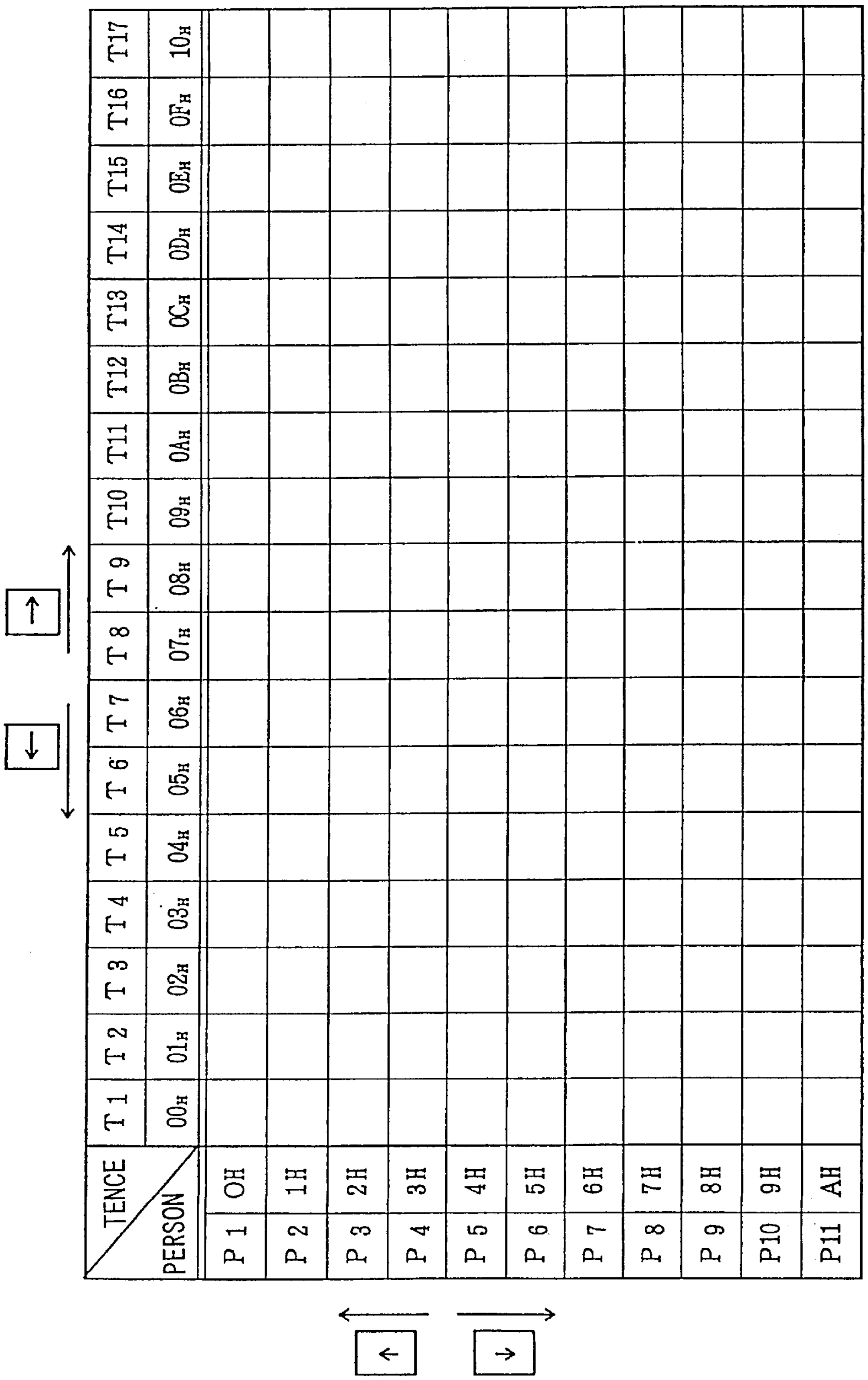
FIG. 5 is an image view showing a two-dimensional form of factors of conjugations in an English-Spanish dictionary.

FIG. 3 is a view showing a keyboard of an English-Spanish dictionary in the embodiments of the input means concerning this invention. ENG key and SPA key are selecting keys to use the dictionary as an English-Spanish dictionary and Spanish-English dictionary, respectively. VERB key is a key used to display conjugation. A down arrow key and an up arrow key are keys used to select the person in the direction of easy flow and the opposite direction respectively. A right arrow key and a left arrow key are keys used to select the tense in the direction of easy flow and the opposite direction, respectively. Detailed examples of the person and the tense are shown in FIGS. 4(A) and (B). P1 to P11 in FIG. 4(A) show the person and T1 to T17 in FIG. 4(B) show the tense. In these examples, there are 187 (11*17) different combinations of the person and the tense. All the combinations may be selected by the four arrow keys of FIG. 3. The selected image is shown two-dimensionally in FIG. 5. When the down arrow key is touched, the person changes to P1, P2, P3, and comes back to P1 after P11. When the up arrow key is touched, the person changes in the opposite direction. When the right arrow key is touched, the tense changes to Ti, T2, T3, and comes back to Ti after T17. When the left arrow key is touched, the tense changes in the opposite direction.

Figure 6:
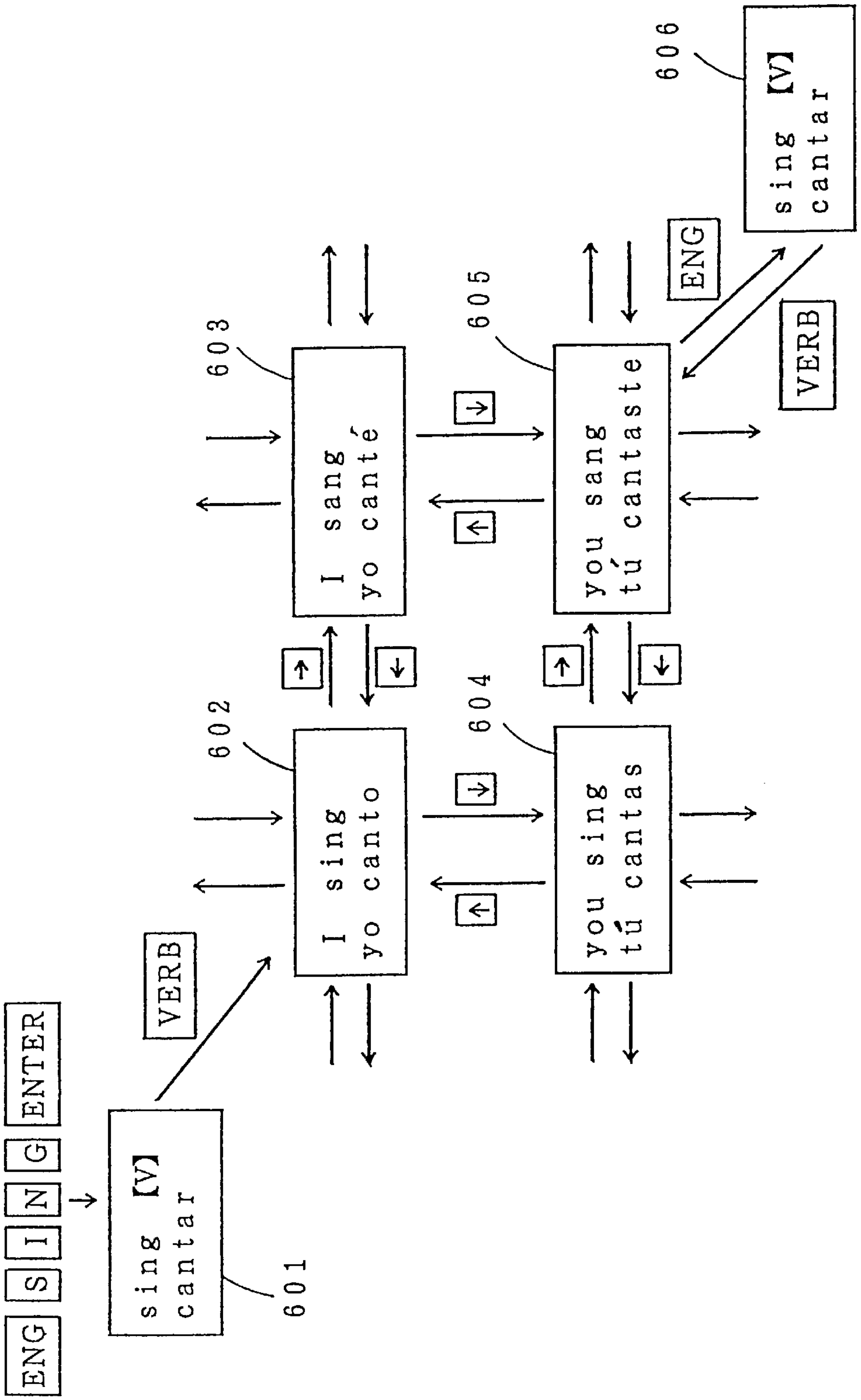
FIG. 6 is a view showing an example of display state transition of English-Spanish dictionary according to the first embodiment.

FIG. 6 is an operation flow-chart to display the inflection when the entry word "SING" is input at English-Spanish dictionary mode based on the presently described embodiment.

Referring to the principle of operation of a first embodiment based on FIG. 6 and FIG. 2. State 601 of FIG. 6 shows the state which "SING" is input as an entry word, and which the English head word and the Spanish equivalent are displayed. Referring to the state in FIG. 2, original data detected based on an input buffer memory 8 is stored in the original buffer memory 13. At the same time, as the original inflection selecting flip-flop 12 selects and outputs the original data, the switching means 15 outputs data of the original buffer memory 13 to display control means 3. Therefore, the original head word "sing" and the equivalent "cantar" are displayed. At the time, the contents of the person set up counter 10 and the tense set up counter 11 are in the initial state, both of them are OH, the inflection generation means 9 commands the data reference means 5 to search the inflection of the first, singular, present, indicative word. The detected inflection data is stored in the inflection buffer memory 14.

When VERB key of the input means 1 is touched at the state 601, the state changes to state 602 displaying the first, singular, present, indicative word in the conjugation. The reason is the following; a signal 20 becomes active when VERB key of the input means 1 is touched, Q-output of the original-inflection selecting flip-flop 12 turns to a H level, and the switching means 15 outputs the inflection data of the inflection buffer memory 14 to the display control means 3 based on the H level of Q-output. At the time, as the detected inflection data at the above mentioned initial state is stored in the inflection buffer memory, the first, singular, present, indicative word is displayed.

State 603 is a state displaying the first, singular, past, indicative word in the conjugation. When the right arrow key is touched, a signal 18 becomes active and the content of the tense determine counter 11 is counted up to 1H while the content of the person set up counter 10 keeps OH. The inflection generation means 9 commands the data reference means to search the inflection data of first, singular, past, indicative word. Therefore, the detected inflection data, namely the data shown in the state 603, is stored in the inflection buffer memory 14. The state 602 changes to the state 603 when the right arrow key is touched once.

State 605 is the state caused when the down arrow key is touched once at the state 603. When the down arrow key is touched, a signal 16 becomes active, the content of the person set up counter 10 is counted up, and the inflection data of the second, singular, familiar, past, indicative word is detected and displayed.

State 606 is the state caused when ENG key is touched at the state 605 and the original data is displayed. When ENG key is touched, a signal 21 becomes active, Q-output of the original inflection selecting flip-flop 12 becomes (a low) level L, and therefore the switching means 15 outputs the original data of the original buffer memory 13 to display control means 3. Moreover, when VERB key is touched at that state, Q-output of the original inflection selecting flip-flop 12 becomes H level again and the switching means 15 outputs the inflection data of the inflection buffer memory 14 to the display control means 3. Here, as the person set up counter 10 and the tense set up counter 11 keep the former set up value, namely the former inflection data is kept in the inflection buffer memory, the display returns to the state 605 of FIG. 6. Even if the display is in any other display state, the original is displayed when the ENG key is touched. When the VERB key is touched during the original display, the display returns to the inflection display, namely display of data stored in the inflection buffer memory, which was displayed just before the ENG key had been touched again. That is the principle of operation of the first embodiment.

Figure 7:
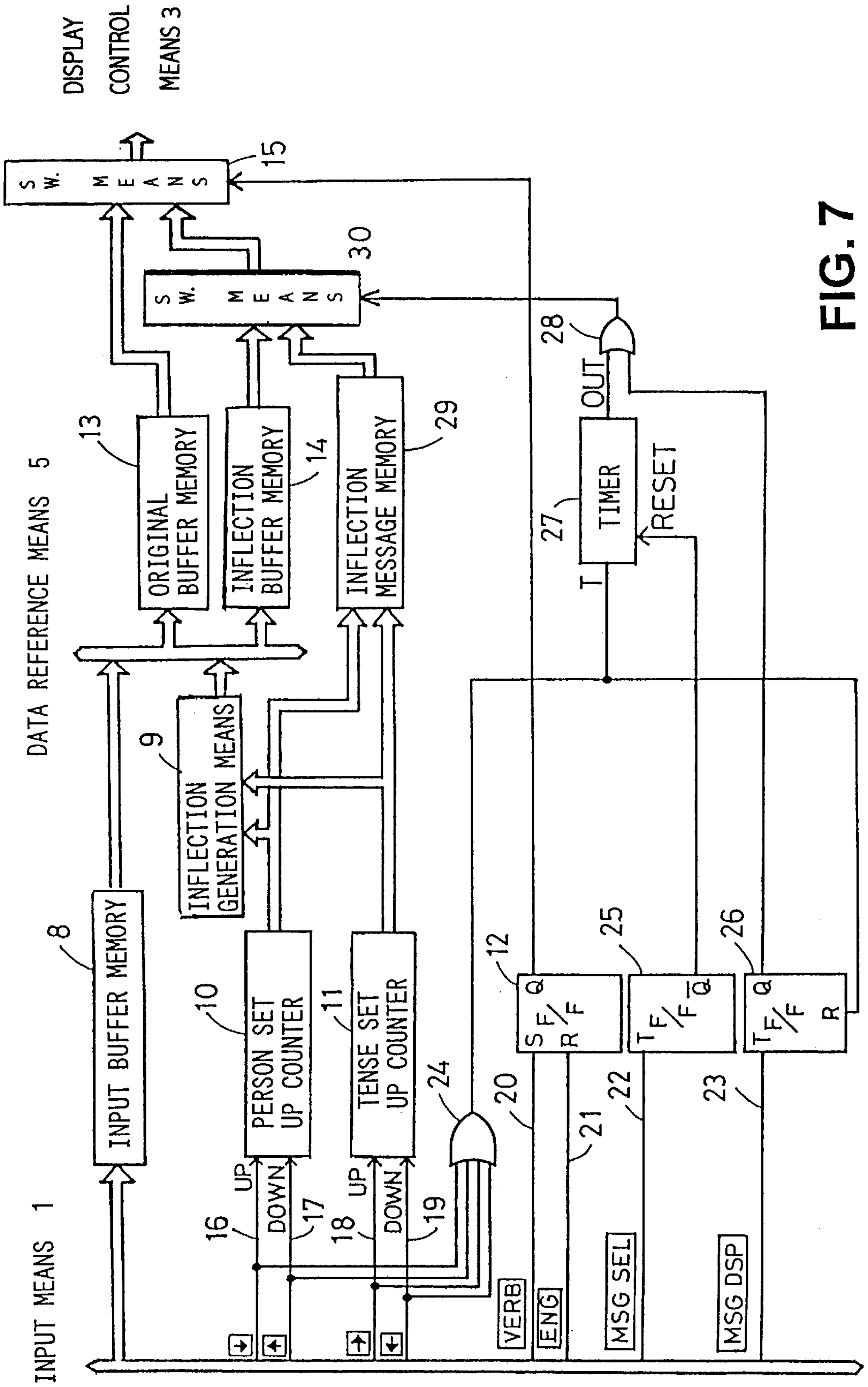
FIG. 7 is a block diagram of a data control means in the electronic dictionary of a second embodiment of this invention.
Figure 8:
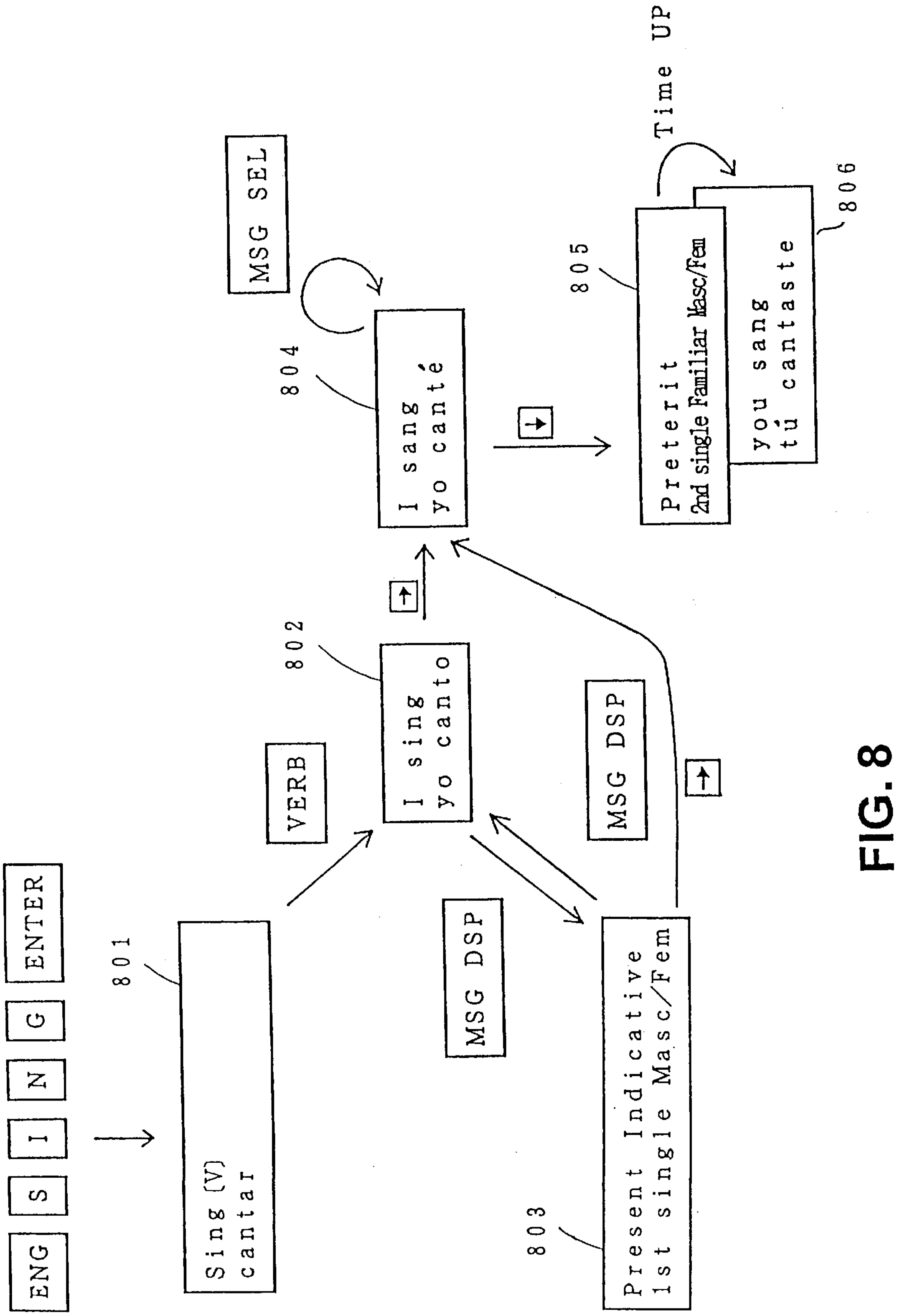
FIG. 8 is a view showing an example of display state transition of English-Spanish dictionary according to the second embodiment.

Referring to a second embodiment based on FIG. 7 and FIG. 8. FIG. 7 is a view showing a portion concerning the second embodiment in the function of the data control means of FIG. 1. Flip-flops 25 and 26, OR circuits 24 and 28, timer 27, inflection message memory 29, and switching means 30 are added to FIG. 2.

FIG. 8 is an operation flow-chart to describe the display of inflection data according to the data control means of FIG. 7 when an entry word "SING" is input at English-Spanish dictionary mode.

State 801 of FIG. 8 is the state displaying the English head word and the Spanish equivalent when "SING" is input in the English-Spanish dictionary as in FIG. 6. When the VERB key of the input means 1 is touched at the state 801, the state changes to state 802, namely the state displaying first, singular, present, indicative word of the conjugation. Here, message data equivalent to the content which is commanded by the person set up counter 10 and the tense set up counter 11 is stored in an inflection message memory 29.

When MSGDSP key is touched at the state 802, a signal 23 becomes active and 0-output of flip-flop 26 changes to H level from L level of the initial state. Because of this, the output of OR circuit 28 becomes a H level and therefore switching means 30 transmits the content of the inflection message memory to the display control means 3 through the switching means. Therefore the state 803 is displayed. Message of first, singular word and message of present, indicative word are displayed at the upper line and lower line of the display respectively. Here, as the signal 23 becomes active again and 0-output of flip-flop 26 returns to L level from H level when MSGDSP key is touched again, the switching means 30 selects the content of the inflection buffer memory 14. The display returns to the state 802.

Next, the signal 18 becomes active and the tense set up counter 11 counts up when the right arrow key is touched at the state 803. The first, singular, past, indicative data referred by the command of the inflection generation means 9 is stored in the inflection buffer memory 14. On the other hand, as the output of the OR circuit 24 becomes active and flip-flop 26 is reset, the switching means 30 selects the content of the inflection buffer memory 14. Consequently, the state 804 is displayed. Here, though output of the OR circuit 24 is T-input (trigger input) of the timer 27, the timer does not operate because Q(reversal output) of flip-flop 25 is at an H level.

When MSGSEL key is touched a signal 22 becomes active, Q(reversal output) of flip-flop 25 changes to an L level, and the reset of the timer 27 is canceled.

Next, the signal 16 becomes active and the person set up counter 10 counts up when the down arrow key is touched. Because of that, second, singular, familiar, past, indicative data searched by the command of the inflection generation means 9 is stored in the inflection buffer memory 14. On the other hand, output of the OR circuit 24 too becomes active and is input in the T-input(trigger input) of the timer 27. As the reset of the timer 27 is canceled, the timer 27 outputs an H level at the same time of T-input and outputs L level again after the time of the timer is up. As output of OR circuit 28 outputs H level while the timer 27 outputs H level, the switching means 30 selects the content of the inflection message memory 29. Namely, second, singular, familiar message and past, indicative message are displayed at the lower line and upper line respectively (state 805). When the time of the timer 27 is up, the switching means 30 changes to select the content of the inflection buffer memory 14 (state 806).

Figure 9:
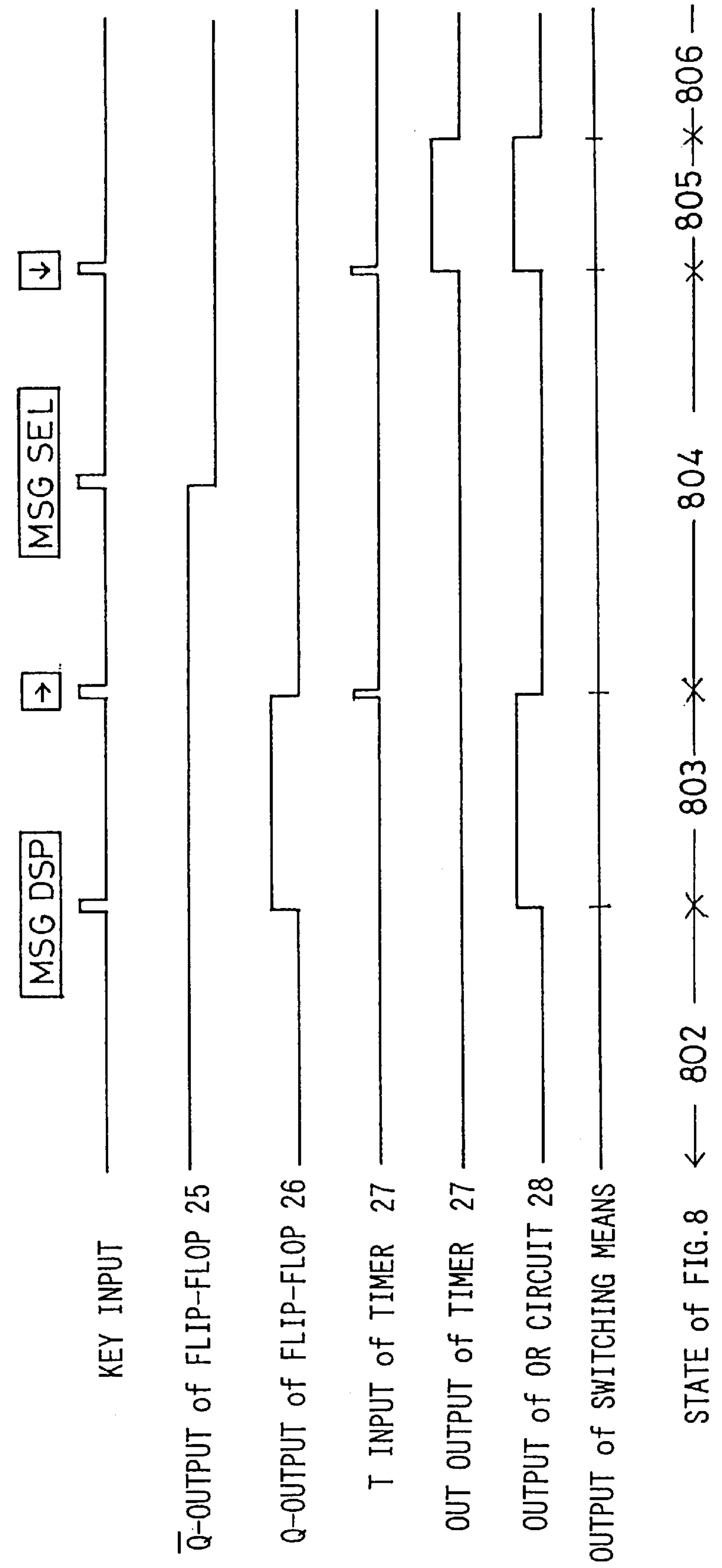
FIG. 9 is a timing-chart of the block diagram in accordance with the present invention.

A timing-chart of these operation is displayed in FIG. 9. FIG. 9 shows the operation after state 802.

That is the principle of operation of the second embodiment.

Figure 10:
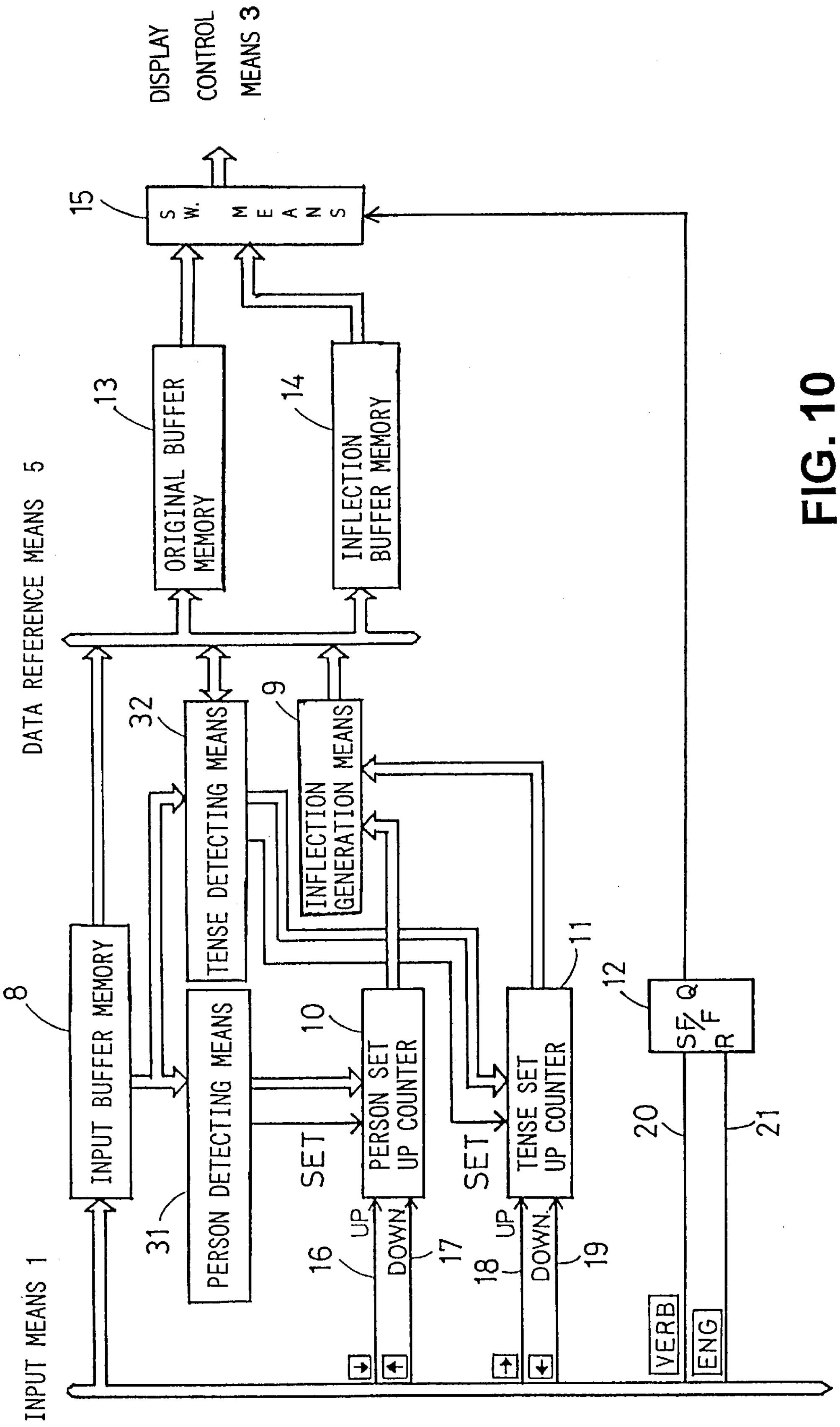
FIG. 10 is a block diagram of a data control means in the electronic dictionary of a third embodiment of this invention.

Referring to a third embodiment of this invention based on FIG. 10. FIG. 10 is a view showing a part of function of the data control means in FIG. 1 concerning the embodiment. The person detecting means 31 and the tense detecting means 32 are added to FIG. 2.

Figure 11B:
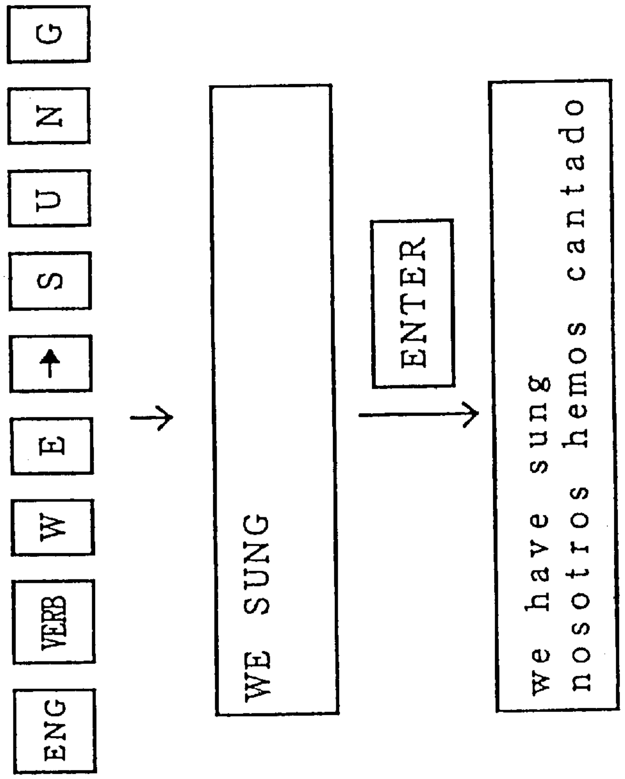
FIGS. 11(*a*) and 11(*b*) are views showing an example of display state transition of English-Spanish dictionary according to the third embodiment.
Figure 11A:
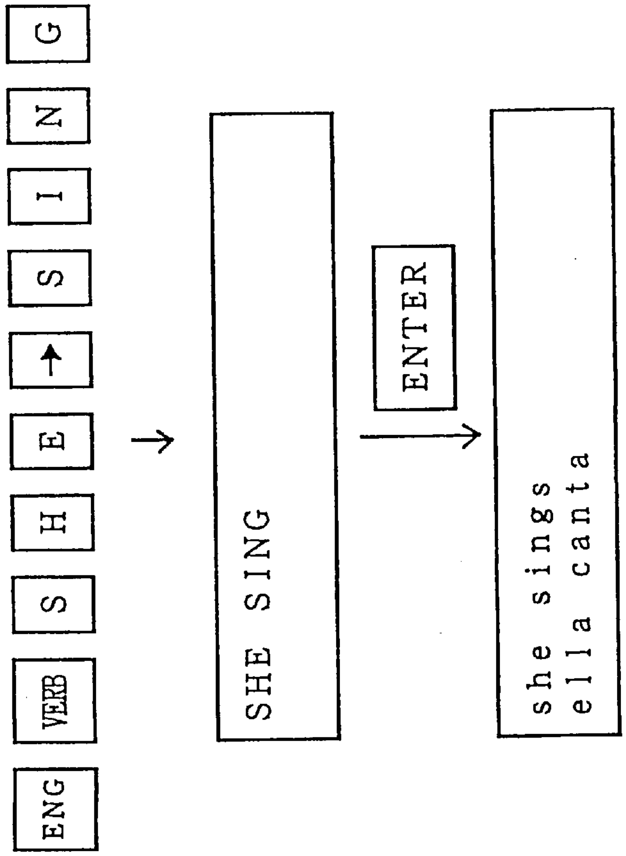

FIG. 11(A) shows an example wherein a grammatically incorrect entry phrase "SHE SING" is input after the VERB key is touched at English-Spanish dictionary mode based on the data control means of FIG. 10. In this case, when the input by operation of the ENTER key is carried out, "sing" is automatically corrected to "sings", and the head word and the equivalent word in third, singular, feminine, present, indicative form are searched and displayed. FIG. 11(B) shows an example wherein a grammatically incorrect entry phrase "WE SUNG" is input in the same manner as the above. In this case, when input by operation of the ENTER key is carried out, it is judged automatically from "sung" that the tense is present, perfect, indicative form. Moreover, judging from a pronoun "we", "have" is selected as an auxiliary, and the head word and the equivalent word are searched and displayed.

The principle of the above mentioned operation is explained as follows.

In FIG. 10, as Q-output of the original inflection selecting flip-flop 12 changes to the H level when VERB key is touched before an entry of letter data, the switching means 15 selects the content of the inflection buffer memory 14. However, as there is not any entry of letter data, nothing is displayed here. When letter data is input in phrase form, the content is once stored in the input buffer memory 8. After that, the person and the tense are detected by person detecting means 31 and tense detecting means 32, and set up by the person set up counter 10 and the tense set up counter 11. At the same time, the original is searched and the original data is stored in the original buffer memory 13. After that, the inflection commanded at the person set up counter 10 and the tense set up counter 11 are stored in the inflection buffer memory 14 as described above.

Here, the principle of operation of person detecting means 31 and the tense detecting means 32 are explained using flow-charts.

Figure 12:
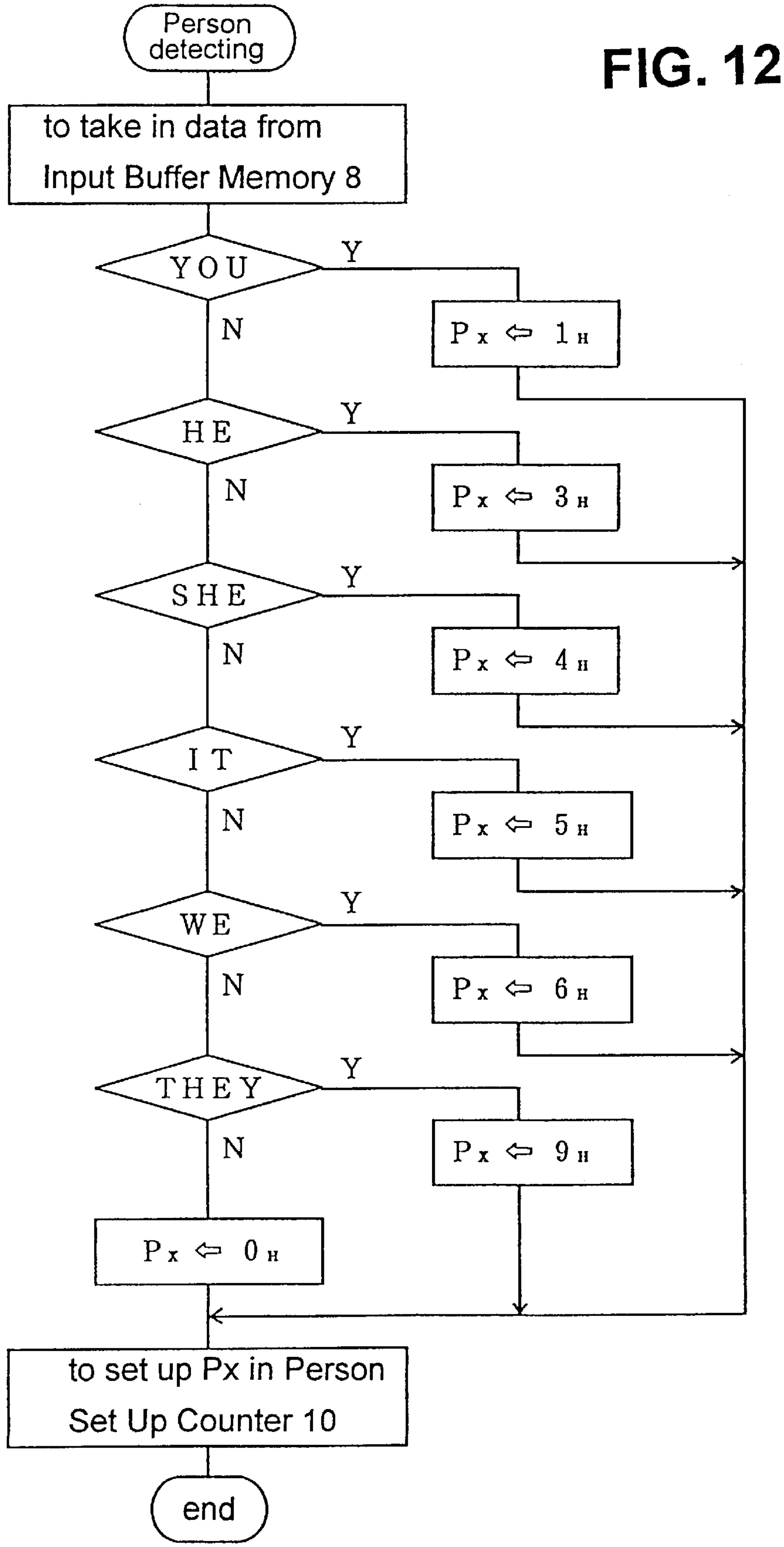
FIG. 12 is a flow-chart showing operation of the person detecting means of the third embodiment.

The principle of operation of the person detecting means 31 is based on a flow-chart of FIG. 12. At first, data is taken in. A pronoun is detected by judging that a space is a pause of words. If "YOU" is found, 1H is set as a variable Px. Here, it is possible for the pronoun "YOU" to be one of four kinds of persons: P2, P3, P8, and P9. As the pronoun is not judged by the input data, 1H, which is a code of P2(second, singular, familiar form), is set up.

Similarly, if "HE" is found, 3H is set in a variable Px. That is carried out similarly about "SHE", "IT", "WE", and "THEY." If these pronouns are not found, OH is set in a variable Px considering first, singular form. At the end, the value of the variable Px is set up at the person set up counter 10. The person is detected from the input data.

Figure 13:
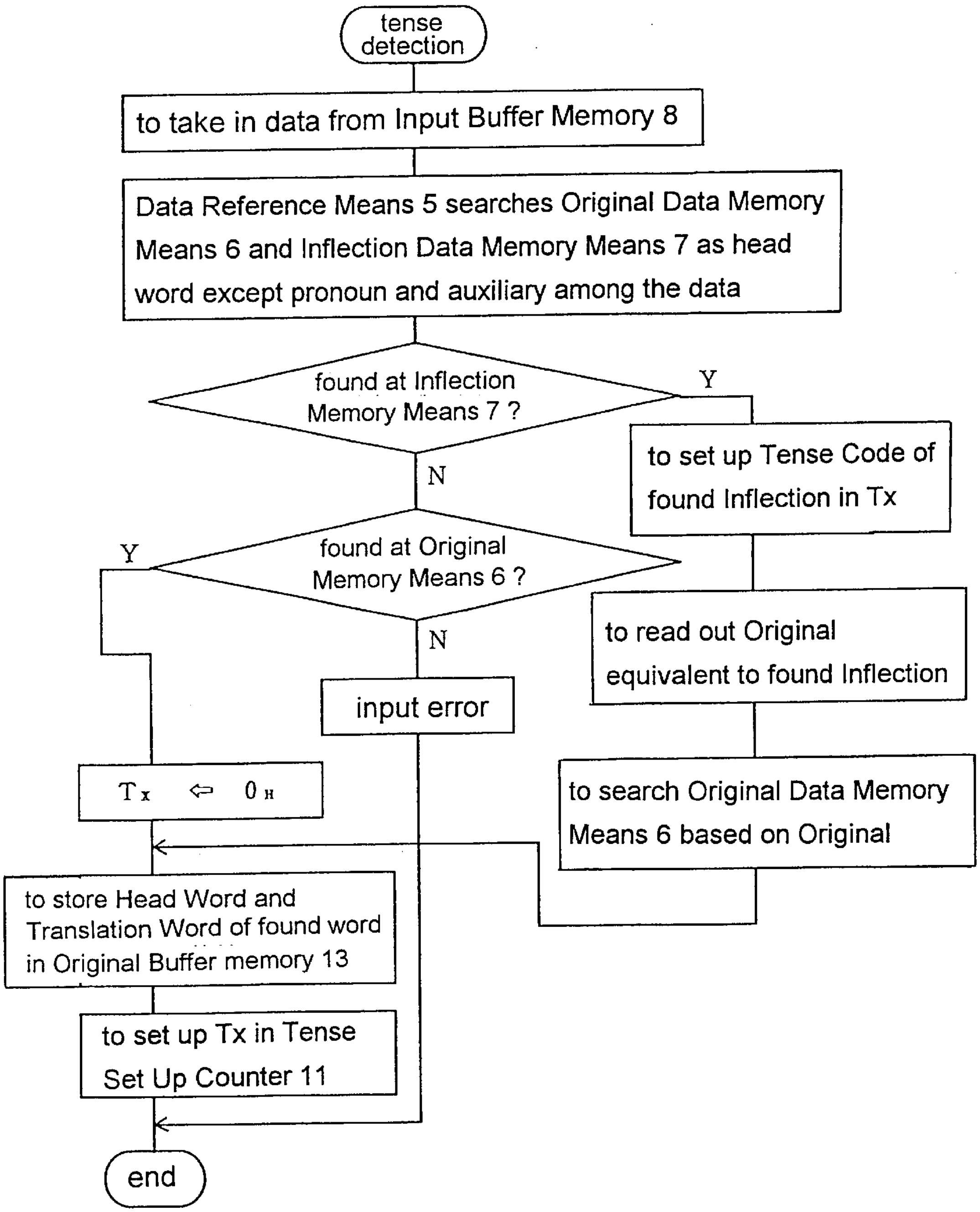
FIG. 13 is a flow-chart showing operation of the tense detecting means of the third embodiment.

Next, referring the principle of operation of the tense detecting means 32 based on a flow-chart of FIG. 13, a data is taken from the input buffer memory 8. Words are picked up among the data judging from that a space is a pause of words. A rest word, which is taken away a pronoun and an auxiliary from the words, becomes a head word. The data referring means 5 searches the original data memory means 6 and the inflection memory means 7 about the head word. When a word applicable to the reference is found at the inflection memory means 7, tense code equivalent to the founded inflection is read out and is set up at a variable Tx. The original word of the found inflection too is read out. The inflection memory means 7 includes in advance data of the translation word and the tense code equivalent to the conjugation. Searching the original memory means 6 for the original word, the original data of the head word and the translation word are read out and stored in the original buffer memory 13. Value of a variable Tx is set up at the tense set up counter 11 after that. If a word applicable to the reference is found at the inflection memory means 7, OH is set up at a variable Tx because the tense is present, indicative form. At the same time, the head word and the translation word are read out and stored in the original buffer memory 13. Value of a variable Tx is set up at the tense set up counter 11 after that. That is the principle of operation of the tense detecting.

When a value of Px and a value of Tx are set up at the person set up counter 10 and the tense set up counter 11 respectively, the inflection data of the person and the tense set up based on the original data of the original buffer memory 13 by the command of the inflection generation means 9 are read out and stored in the inflection buffer memory 14. As the switching means 15 selects the content of the inflection buffer memory 14, the above inflection data is displayed in the display means 2.

In this manner, as the inflection is generated again based on the original after the data finds the original once if the data input grammatically wrong like FIG. 11(*a*) and FIG. 11(*b*), the grammatical mistakes are corrected. That is the principle of operation of third embodiment.

Although a way to read out and display the inflection from the inflection data memory 7 of the dictionary data memory means is described in this embodiment, it is possible to display by logic circuit means about a regular verb, the ending of which changes with some regulation.

The similar display function is able to be realized for not only conjugation but also declension using the construction of this embodiment.

As mentioned above, this invention has the input means designating the person, the person set up means keeping the designating state, the input means designating the tense, and the tense set up means keeping the designating state in the electronic dictionary having the displaying function of the conjugation. As this invention has the switching means switching the display of the original and the inflection in addition to these independent means, it is possible for all inflections of combination of the person and the tense equivalent to the conjugation to read out in order and to display in a simple and speedy way, and for the inflection and the original to switch and display in simple operation.

As this invention has the message memory showing the state of inflection and the switching means to display selectively the content, it is possible that message showing the state of the person and the tense is displayed when it is required.

As this invention has the person detecting means and the tense detecting means connected to the input buffer memory, it is possible to detect grammatical mistakes of the language (entry word) input in phrase form to display the head word (corrected entry word) and the translation word.

Mentioned above, this invention has the effect to provide a functional and easy operational electronic dictionary.

Explanation of Symbols

4: Data control means
8: Input buffer memory
9: Inflection generation means
10: Person set up counter
11: Tense set up
13: Original buffer memory
14: Inflection buffer memory
15,16: Switching means
27: Timer
29: Inflection message memory
31: Person detecting means
32: Tense detecting means

What is claimed is:

1. An electronic dictionary and language interpreter device comprising:

input means for inputting letter data and control commands;

an input buffer memory for storing letter data input to the input means;

a dictionary-data memory for storing dictionary-data comprising a plurality of head words in a first language and a plurality of corresponding translation words in at least one second language;

inflection set up means for setting up the person and the tense of translation words to be displayed and having independently controllable person set up means and tense set up means for independently setting up the person and the tense of translation words based on letter data and commands input to the input means;

data reference means for searching the dictionary-data memory for original data comprising translation words equivalent to entry words formed by the letter data stored in the input buffer memory and inflection data corresponding to the entry words based on the person and tense set up by the inflection set up means;

display control means for converting dictionary data searched by the data reference means into display data; and display means for displaying the display data visually;

wherein the person set up means and the tense set up means are each responsive to separate commands entered into the input means to control the data reference means to search the dictionary-data memory for inflection data, such that multiple inflections of translation words can be sequentially viewed on the display means by controlling the input means.

2. An electronic dictionary and language interpreter device according to claim 1; further comprising an original data buffer memory for temporarily storing the original data, and an inflection data buffer memory for temporarily storing the inflection data.

3. An electronic dictionary and language interpreter device according to claim 2; further comprising switching means for selecting one of the original data stored in the original data buffer memory and the inflection data stored in the inflection data buffer memory and for transmitting the selected data to the display control means to alternate the display of original data and inflection data.

4. An electronic dictionary and language interpreter device according to claim 1; wherein the input means has a plurality of user operable switches for independently controlling the person set up means and the tense set up means to sequentially display inflection data corresponding to different conjugations of translation words.

5. An electronic dictionary and language interpreter according to claim 1; wherein the input means comprises a keyboard having a plurality of first data entry keys for entering letter data, a plurality of second data entry keys for entering translation commands and a third plurality of keys for entering scrolling commands.

6. An electronic dictionary and language interpreter according to claim 5; wherein the plurality of second data entry keys comprise a first key for specifying a translation language, a second key for specifying a verb, and a third key for displaying a message.

7. An electronic dictionary and language interpreter according to claim 5; wherein the person set up means and the tense set up means include means responsive to the third plurality of keys.

8. An electronic dictionary and language interpreter according to claim 7; wherein the third plurality of keys comprises a first pair of arrow keys for controlling the person set up means upon activation of one of the first arrow keys to control the data reference means to sequentially search the dictionary-data memory for inflection data corresponding to allowable conjugations of a displayed translation word, so that multiple inflections of the translation word in terms of the person are sequentially viewed on the display means in response to activation of one of the first pair of arrow keys.

9. An electronic dictionary and language interpreter according to claim 8; wherein the first pair of arrow keys comprises a forward arrow key and a reverse arrow key, so that the display of multiple inflections of the translation word can be controlled in a forward and reverse manner.

10. An electronic dictionary and language interpreter according to claim 7; wherein the third plurality of keys comprises a second pair of arrow keys for controlling the tense set up means upon activation of one of the second arrow keys to control the data reference means to sequentially search the dictionary-data memory for inflection data corresponding to allowable conjugations of a displayed translation word, so that multiple inflections of the translation word in terms of the tense are sequentially viewed on the display means in response to activation of one of the second pair of arrow keys.

11. An electronic dictionary and language interpreter according to claim 10; wherein the second pair of arrow keys comprises a forward arrow key and a reverse arrow key, so that the display of multiple inflections of the translation word can be controlled in a forward and reverse manner.

12. An electronic dictionary and language interpreter device comprising:

input means for inputting letter data and control commands;

an input buffer memory for storing the letter data input to the input means;

a dictionary-data memory for storing dictionary data including a plurality of head words in a first language and a plurality of corresponding translation words in at least one second language;

data reference means for searching the dictionary-data memory for requested dictionary-data;

inflection generation means for setting up the person and the tense of translation words to be displayed and having independently controllable person set up means and tense set up means for independently setting up the person and the tense of translation words based on letter data and commands input to the input means, the inflection generation means being operative to control the data reference means to search for inflection data based on the person and tense designated by the person set up means and the tense set up means;

an original data buffer memory for storing original data comprising translation words equivalent to entry words formed by the letter data stored in the input buffer memory and searched by the data reference means;

an inflection data buffer memory for storing inflection data searched by the data reference means based on the person and tense designated by the person set up means and the tense set up means;

display control means for converting the dictionary data searched by the data reference means into display data;

display means for displaying the display data visually;

select signal generation means for generating a select signal used to select one of the original data stored in the original data buffer memory and the inflection data stored in the inflection data buffer memory; and switching means for selecting one of the original data stored in the original data buffer memory and the inflection data stored in the inflection data buffer memory based on the select signal and for transmitting the selected data to the display control means so that the original data and the inflection data may be selectively displayed on an alternate basis.

13. An electronic dictionary and language interpreter device comprising:

input means for inputting letter data and control commands;

an input buffer memory for storing the letter data input by the input means;

a dictionary-data memory for storing dictionary data including a plurality of head words of a first language and a plurality of corresponding translation words of at least one second language equivalent to the head words;

data reference means for searching the dictionary-data memory for requested dictionary data;

inflection generation means for setting up the person and the tense of translation words to be displayed and having independently controllable person set up means and tense set up means for independently setting up the person and the tense of translation words based on letter data and commands input to the input means, the inflection generation means being operative to control the data reference means to search for conjugation data based on the person and the tense designated by the person set up means and the tense set up means;

an inflection data buffer memory for storing, in phrase form with pronoun, conjugation data including head words and translation words based on the person and tense designated by the person set up means and the tense set up means;

display control means for converting the dictionary data searched by the data reference means into display data; and display means for displaying the display data visually.

14. An electronic dictionary and language interpreter device according to claim 13; further comprising an inflection message memory containing message data representing a plurality of messages for indicating different combinations of person and tense designated by the person set up means and the tense set up means, and switching means for selecting the output of one of the inflection data buffer memory and the inflection message memory and for transmitting the selected output to the display control means so as to alternately display the output of the inflection data buffer memory and the output of the inflection message memory.

15. An electronic dictionary and language interpreter device according to claim 14; wherein the input means includes a switch for controlling the switching means to alternately select the output of the inflection data buffer memory and the output of the inflection message memory.

16. An electronic dictionary and language interpreter device according to claim 14; further comprising a timer for generating a timing signal; and wherein the switching means is responsive to the timing signal to alternately select the output of the inflection data buffer memory and the output of the inflection message memory so that a display alternating between the inflection data and the inflection message is provided.

17. An electronic dictionary and language interpreter device according to claim 16; wherein operation of the timer is set up to be active or inactive.

18. An electronic dictionary and language interpreter device comprising:

an input means for inputting letter data and control commands;

an input buffer memory for storing the letter data input by the input means;

person detecting means for detecting the personal conjugation of word data formed of letter data in phrase form stored in the input buffer memory based on grammar of a first language;

tense detecting means for detecting the tense of the word data in phrase form stored in the input buffer memory based on grammar of the first language;

a dictionary-data memory for storing dictionary data including a plurality of head words of a first language and a plurality of corresponding translation words of at least one second language equivalent to the head words;

data reference means for searching the dictionary data memory for requested dictionary data;

an inflection generation means for setting up the person and the tense of translation words to be displayed and having independently controllable person set up means and tense set up means for independently setting up the person and the tense of translation words based on letter data and commands input to the input means, the inflection generation means being operative to control the data reference means to search for conjugation data based on the person and tense designated by the person set up means and the tense set up means;

an inflection buffer memory for storing, in phrase form with pronoun, conjugation data including the head words and the translation words based on the person and tense designated by the person set up means and the tense set up means;

display control means for converting the dictionary data referred by the data reference means into display data; and display means for displaying the display data visually.

19. An electronic dictionary and language interpreter device comprising:

input means for inputting letter data and control commands;

a dictionary data memory for storing dictionary data comprised of a plurality of head words in a first language and a plurality of corresponding translation words in at least one second language;

inflection set up means for setting up the person and the tense of translation words to be displayed and having independently controllable person set up means and tense set up means for independently setting up the person and the tense of translation words based on letter data and commands input to the input means;

data reference means for searching the dictionary data memory for original data comprising translation words equivalent to entry words formed by the letter data and inflection data corresponding to the entry words based on the person and tense set up by the inflection set up means; and means for displaying the translation words;

wherein the person set up means and the tense set up means are each responsive to separate commands entered into the input means to control the data reference means to search the dictionary-data memory for inflection data, such that multiple inflections of translation words can be sequentially displayed by controlling the input means.

20. An electronic dictionary and language interpreter device according to claim 19; further comprising an original data buffer memory for temporarily storing the original data, and an inflection data buffer memory for temporarily storing the inflection data.

21. An electronic dictionary and language interpreter device according to claim 20; further comprising switching means for selecting one of the original data stored in the original data buffer memory and the inflection data stored in the inflection data buffer memory and for transmitting the selected data to the display control means to alternate the display of original data and inflection data.

22. An electronic dictionary and language interpreter device according to claim 19; wherein the input means has a plurality of user operable switches for independently controlling the person set up means and the tense set up means to sequentially display inflection data corresponding to different conjugations of translation words.

23. An electronic dictionary and language interpreter device according to claim 19; further comprising an original data buffer memory for storing original data comprising words searched by the data reference means; and an inflection data buffer memory for storing inflection data searched by the data reference means based on the person and tense designated by the person set up means and the tense set up means.

24. An electronic dictionary and language interpreter device according to claim 23; further comprising select signal generation means for generating a select signal used to select one of the original data stored in the original data buffer memory and the inflection data stored in the inflection data buffer memory; and switching means for selecting one of the original data stored in the original data buffer memory and the inflection data stored in the inflection data buffer memory based on the select signal and for transmitting the selected data to the display control means so that the original data and the inflection data may be selectively displayed on an alternate basis.

25. An electronic dictionary and language interpreter device according to claim 19; further comprising an inflection message memory containing message data for representing a plurality of messages for indicating different combinations of person and tense designated by the person set up means and the tense set up means; and switching means for selecting the output of one of the inflection data buffer memory and the inflection message memory and for transmitting the selected output to the display control means.

26. An electronic dictionary and language interpreter device according to claim 25; wherein the input means includes a switch for controlling the switching means to alternately select the output of the inflection data buffer memory and the output of the inflection message memory.

27. An electronic dictionary and language interpreter device according to claim 25; further comprising a timer for generating a timing signal; and wherein the switching means is responsive to the timing signal to alternately select the output of the inflection data buffer memory and the output of the inflection message memory so that a display alternating between the inflection data and the inflection message is provided.

28. An electronic dictionary and language interpreter according to claim 19; further comprising person detecting means for detecting the personal conjugation of word data formed of letter data in phrase form stored in the input buffer memory based on grammar of a first language; and tense detecting means for detecting the tense of the word data in phrase form stored in the input buffer memory based on grammar of the first language; and wherein the person set up means includes means for designating the personal conjugation of a translation word based upon an output of the person detecting means and the tense set up means includes means for designating the tense of the translation word based upon an output of the tense detecting means.

29. An electronic dictionary and language interpreter according to claim 19; wherein the input means comprises a keyboard having a plurality of first data entry keys for entering letter data, a plurality of second data entry keys for entering translation commands and a third plurality of keys for entering scrolling commands.

30. An electronic dictionary and language interpreter according to claim 29; wherein the plurality of second data entry keys comprise a first key for specifying a translation language, a second key for specifying a verb, and a third key for displaying a message.

31. An electronic dictionary and language interpreter according to claim 29; wherein the person set up means and the tense set up means include means responsive to the third plurality of keys.

32. An electronic dictionary and language interpreter according to claim 31; wherein the third plurality of keys comprises a first pair of arrow keys for controlling the person set up means upon activation of one of the first arrow keys to control the data reference means to sequentially search the dictionary-data memory for inflection data corresponding to allowable conjugations of a displayed translation word, so that multiple inflections of the translation word in terms of the person are sequentially viewed on the display means in response to activation of one of the first pair of arrow keys.

33. An electronic dictionary and language interpreter according to claim 32; wherein the first pair of arrow keys comprises a forward arrow key and a reverse arrow key, so that the display of multiple inflections of the translation word can be controlled in a forward and reverse manner.

34. An electronic dictionary and language interpreter according to claim 31; wherein the third plurality of keys comprises a second pair of arrow keys for controlling the tense set up means upon activation of one of the second arrow keys to control the data reference means to sequentially search the dictionary-data memory for inflection data corresponding to allowable conjugations of a displayed translation word, so that multiple inflections of the translation word in terms of the tense are sequentially viewed on the display means in response to activation of one of the second pair of arrow keys.

35. An electronic dictionary and language interpreter according to claim 34; wherein the second pair of arrow keys comprises a forward arrow key and a reverse arrow key, so that the display of multiple inflections of the translation word can be controlled in a forward and reverse manner.

* * * * *